United States Patent
Zou et al.

(10) Patent No.: US 8,345,630 B2
(45) Date of Patent: Jan. 1, 2013

(54) METHOD OF CARRIER RESELECTION FOR PROVIDING SELECTIVE TRAFFIC REDIRECTION

(75) Inventors: Jialin Zou, Randolph, NJ (US); David Rossetti, Randolph, NJ (US); Christopher Francis Mooney, Essex, NJ (US)

(73) Assignee: Alcatel Lucent, Paris (FR)

( * ) Notice: Subject to any disclaimer, the term of this patent is extended or adjusted under 35 U.S.C. 154(b) by 561 days.

(21) Appl. No.: 12/292,675

(22) Filed: Nov. 24, 2008

(65) Prior Publication Data

US 2010/0128608 A1    May 27, 2010

(51) Int. Cl.
*H04E 4/00*    (2006.01)

(52) U.S. Cl. .......................... 370/331; 455/442

(58) Field of Classification Search .................. 370/331, 370/332, 333; 455/442, 443
See application file for complete search history.

(56) References Cited

U.S. PATENT DOCUMENTS

| | | | |
|---|---|---|---|
| 2006/0251023 A1* | 11/2006 | Choi | 370/331 |
| 2007/0049325 A1* | 3/2007 | Lee | 455/525 |
| 2009/0073933 A1* | 3/2009 | Madour et al. | 370/331 |
| 2009/0088176 A1* | 4/2009 | Teo et al. | 455/452.1 |
| 2009/0181676 A1* | 7/2009 | Lee et al. | 455/436 |
| 2009/0207805 A1* | 8/2009 | Zou | 370/331 |

\* cited by examiner

*Primary Examiner* — Mark Rinehart
*Assistant Examiner* — Matthew Hopkins
(74) *Attorney, Agent, or Firm* — Harness, Dickey & Pierce

(57) ABSTRACT

In one embodiment, the access terminal (AT) receives a switching ratio, the AT randomly generates a serving priority value from a uniformly distributed random variable, and the AT determines whether to switch from the first carrier and attach to one of the neighboring carriers based on the serving priority value and the switching ratio.

22 Claims, 9 Drawing Sheets

METHOD OF CARRIER RESELECTION FOR PROVIDING SELECTIVE TRAFFIC REDIRECTION

BACKGROUND OF THE INVENTION

1. Field

Example embodiments of the present invention relate generally to wireless systems, carrier reselection (or idle handoff) and traffic redirection in wireless systems having multiple carriers with overlapping coverage areas including wireless systems having carriers representing more than one radio access technology (RAT). Those RATs are specified by various radio access technology standards such as CDMA2000 High Rate Packet Data (HRPD) or Data Optimized (DO), CDMA2000 3G1x, Long Term Evolution (LTE), Universal Mobile Telecommunication System (UMTS), etc.

2. Description of Related Art

When an access terminal (AT) is in idle state and moves across a geographic area having overlapping coverage areas of carriers following different radio access technologies (RATs), inter-RAT idle handoff, or cell re-selection, will be conducted. Conventional methods provide for a hard switch over of hand-off, with the AT changing connection from carriers following a first RAT to carriers following a second RAT. According to conventional methods, 100% of the ATs entering an area with overlapping coverage may be re-directed from the first RAT to the second RAT. Simply performing a hard switch over or hand-off may be more suitable for a case where carriers of two different RATs have coverage areas that only substantially overlap at a border of the coverage areas. In practice, there are many cases where coverage areas of carriers following a first RAT are spotty and are overlapped by a nationwide coverage area of carriers following a second RAT. For example, many operators have networks with High Rate Packet Data (HRPD) RAT, which have nationwide coverage areas, and networks with Long Term Evolution (LTE) RAT, which have spotty coverage areas that overlap the nationwide coverage areas of the HRPD networks.

SUMMARY OF THE INVENTION

The present invention relates to methods of controlling redirection of AT traffic in geographic areas having overlapping coverage of carriers.

Example embodiments include methods for controlling the switching behavior of ATs based on information broadcasted from an access network. An AN associated with a first carrier broadcasts priority values to access terminals (ATs) attached to the first carrier. The priority values are associated with each of one or more neighboring carriers. The one or more neighboring carriers are carriers with coverage areas that overlap with a coverage area of the first carrier.

In one embodiment, the AN broadcasts a switching ratio to the ATs. The switching ratio controls a percentage of the idle ATs, which switch from the first carrier to a carrier from among the one or more neighboring carriers.

In another embodiment, the AN broadcasts a priority range to the ATs. The priority range includes minimum and maximum values and controls a range in which serving priority values are generated at the ATs.

Example embodiments include methods by which an AT determines whether or not to switch carriers. An AT attached to a first carrier receives priority values associated with each of one or more neighboring carriers having coverage areas that overlap a coverage area of the first carrier.

In one embodiment, the AT receives a switching ratio, the AT randomly generates a serving priority value from a uniformly distributed random variable, and the AT determines whether to switch from the first carrier and attach to one of the neighboring carriers based on the serving priority value and the switching ratio.

In another embodiment, the AT receives a priority range, randomly generates a serving priority value which is uniformly distributed within the received priority range, and determines whether to switch from the first carrier to a carrier from among the one or more neighboring carriers based the serving priority value and the priority values of the one or more neighboring carriers.

In another embodiment, the AT receives an assigned priority value associated with the first carrier and determines whether to switch from the first carrier to a neighboring carrier based on the assigned priority value, the priority values of the neighboring carriers, and signal power values of the neighboring carriers.

In any of the above described embodiments, the first carrier and the one or more neighboring carriers may have the same radio access technology.

In any of the above described embodiments, the first carrier follows a first radio access technology, and the one or more neighboring carriers follow a different, second radio access technology.

Example embodiments also include methods of powering up an access terminal in an area having overlapping coverage from multiple RATs. In one embodiment, an AT is powered up and upon powering up the AT, the AT randomly chooses between connecting the AT to carriers of a first RAT and connecting the AT to carriers of a second RAT at a probability based on the probability value assigned to the AT by the network operator.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
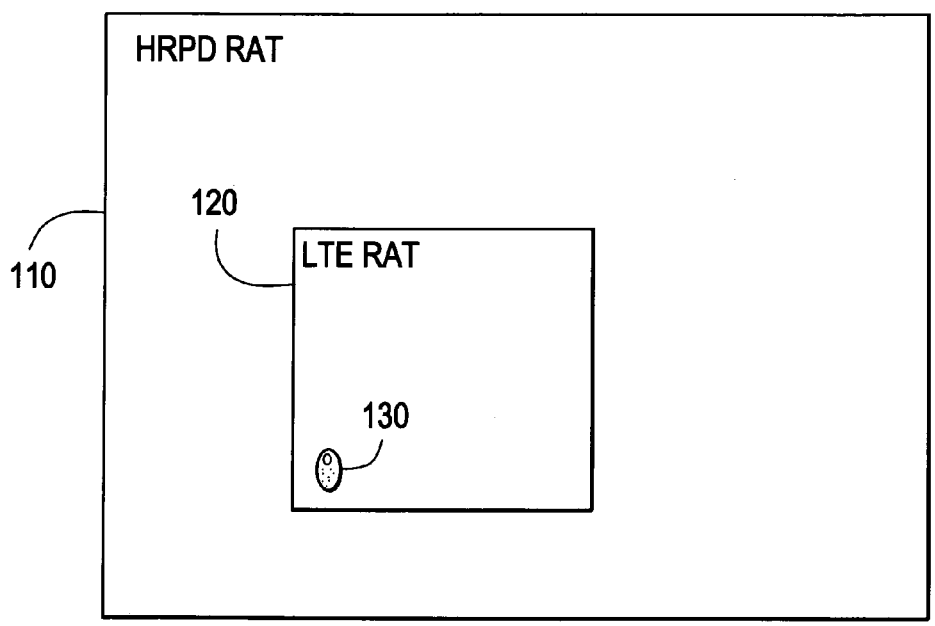
FIG. 1 is a diagram illustrating a wireless system having two RATs with overlapping coverage areas.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term access terminal (AT) may be considered synonymous to, and may hereafter be occasionally referred to, as a terminal, mobile unit, mobile station, mobile user, user equipment (UE), subscriber, user, remote station, access terminal, receiver, etc., and may describe a remote user of wireless resources in a wireless communication network. The term base station may be considered synonymous to and/or referred to as a base transceiver station (BTS), Node B, extended Node B, femto cell, access point, etc. and may describe equipment that provides the radio baseband functions for data and/or voice connectivity between a network and one or more users.

FIG. 1 illustrates wireless system 100 including an HRPD-only coverage area 110 and a HRPD/LTE coverage area 120. The first coverage area 110 is associated with an HRPD access network (AN) using a HRPD RAT, and the second coverage area 120 is associated with both the HRPD AN and an LTE AN using a LTE RAT.

The HRPD AN may include, for example, one or more radio network controllers (RNC) each connected to a plurality of base stations (not shown). ATs in the first coverage area 110 may communicate with the HRPD AN via carriers handled by the base stations. The first coverage area 110 represents the range of the carriers that are handled by the base stations and associated HRPD RAT.

The LTE AN may include, for example, one or more mobility management entities (MME) each connected to a plurality of extended node Bs (eNBs) (not shown). ATs in the second coverage area 120 may communicate with the LTE AN via carriers handled by the eNBs. The second coverage area 120 represents the range of the carriers handled by the eNBs and associated with the LTE RAT, which overlaps the range of the carriers associated with HRPD RAT.

An idle AT 130 may attach to carriers within range of the AT 130. While in HRPD-only coverage area 110, the AT 130 may be attached to an HRPD carrier. While in HRPD/LTE coverage area 120, the AT 130 may be attached to either an HRPD carrier or an LTE carrier. FIG. 1 illustrates the AT 130 in the HRPD/LTE coverage area 120 merely as an example.

Three types of carriers will be discussed: serving carriers, neighboring HRPD carriers, and neighboring LTE carriers. The serving carrier is the carrier to which the AT 130 is currently attached. Neighboring HRPD carriers are HRPD carriers, other than the serving carrier, within range of the AT 130. Neighboring LTE carriers are LTE carriers, other than the serving carrier, within range of the AT 130.

When traveling in HRPD-only coverage area 110, the AT 130 will have an HRPD carrier as a serving carrier. When traveling from HRPD-only coverage area 110 to HRPD/LTE coverage area 120, the AT 130 will make a decision on whether or not to leave the HRPD serving carrier, switch RATs, and attach to a neighboring LTE carrier. The AT 130 will make this decision based on information received from the HRPD AN. The methods by which the HRPD AN provides information to the AT 130 will be discussed further below in conjunction with FIGS. 2 and 4. The methods by which the AT uses the information provided by the HRPD AN to choose whether or not to switch RATs will be discussed further below in conjunction with FIGS. 3, 5 and 6.

A method of handling traffic redirection in an area having overlapping coverage from multiple RATs according to an example embodiment of the invention will now be described with reference to FIGS. 1 and 2.

Figure 2:
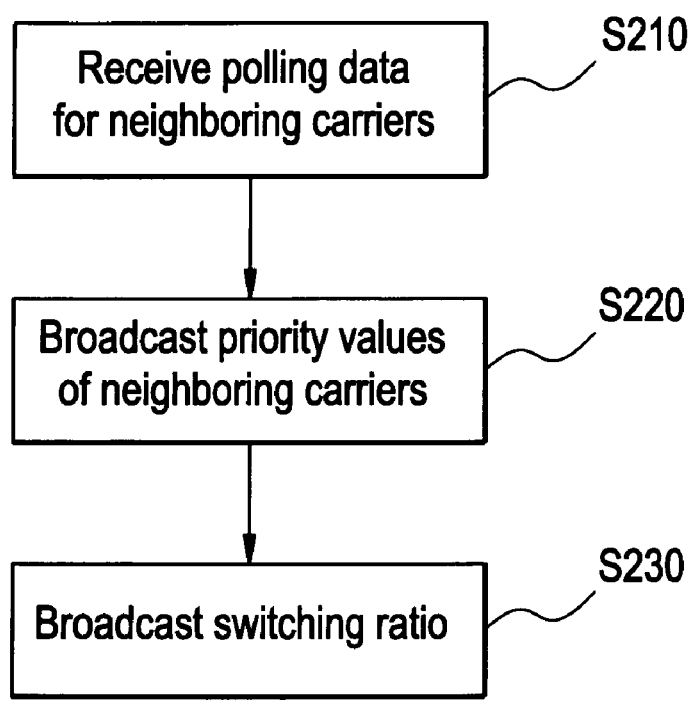
FIG. 2 is a flow chart illustrating a method of using a switching ratio to control traffic redirection in an area having overlapping coverage from multiple RATs.

FIG. 2 is a flow chart depicting a method by which an HRPD AN controls traffic redirection for ATs leaving a coverage area with one RAT and entering a coverage area having multiple RATs using a switching ratio broadcast to ATs. Referring to FIG. 2, in step S210, the HRPD AN handling first coverage area 110 receives polling data including information regarding carriers associated with the LTE AN. For example, an RNC in the HRPD AN may send a request to an MME in the LTE AN for information regarding loading conditions of carriers handled by the LTE AN, and the MME may respond to the RNC with the requested information. Alternatively, the LTE AN may periodically send information to the HRPD AN without a request from the HRPD AN. The HRPD AN may communicate with the LTE AN through, for example, an S101 tunnel.

In step S220, the HRPD AN may broadcast priority values associated with neighboring LTE carriers to idle ATs inside the HRPD/LTE coverage area 120 that are associated with the HRPD AN via a HRPD serving carrier. The idle ATs may have recently left HRPD-only coverage area 110 and entered HRPD/LTE coverage area 120. The priority values may be calculated by the HRPD AN based on the loading conditions included in the polling data received in step S210. For example, the HRPD AN may assign priority values to heavily loaded LTE carriers that prevent ATs currently attached to the HRPD AN from attaching to the heavily loaded LTE carriers, and the HRPD AN may assign priority values to lightly loaded LTE carriers that increase the likelihood that ATs currently attached to the HRPD AN attach to the lightly loaded LTE carriers. The priority values associated with the LTE carriers may be represented as, for example, three bit values each having a minimum value of '0' and a maximum value of '7'. The manner in which an AT uses the broadcasted priority values will be described further below in conjunction with FIG. 3.

In step S230, the HRPD AN may broadcast a switching ratio to idle ATs inside the HRPD/LTE area 120 having HRPD serving carriers. An operator of the HRPD AN may set and/or change the broadcasted switching ratio to control the ratio of idle ATs that switch RATs and attach to the LTE AN upon leaving the HRPD-only coverage area 110 and entering the HRPD/LTE coverage area 120. The switching ratio may be represented as, for example, a three bit value having a minimum value of '0' and a maximum value of '7'. The manner in which an AT uses the broadcasted switching ratio to control its RAT switching behavior will be described further below in conjunction with FIG. 3.

A method of determining whether to switch RATs when entering an area having coverage from multiple RATs according to an example embodiment will now be described with reference to FIGS. 1 and 3. This embodiment will be described referring to idle AT 130 in FIG. 1 as if AT 130 left HRPD-only coverage area 110 and entered HRPD/LTE coverage area 120.

Figure 3:
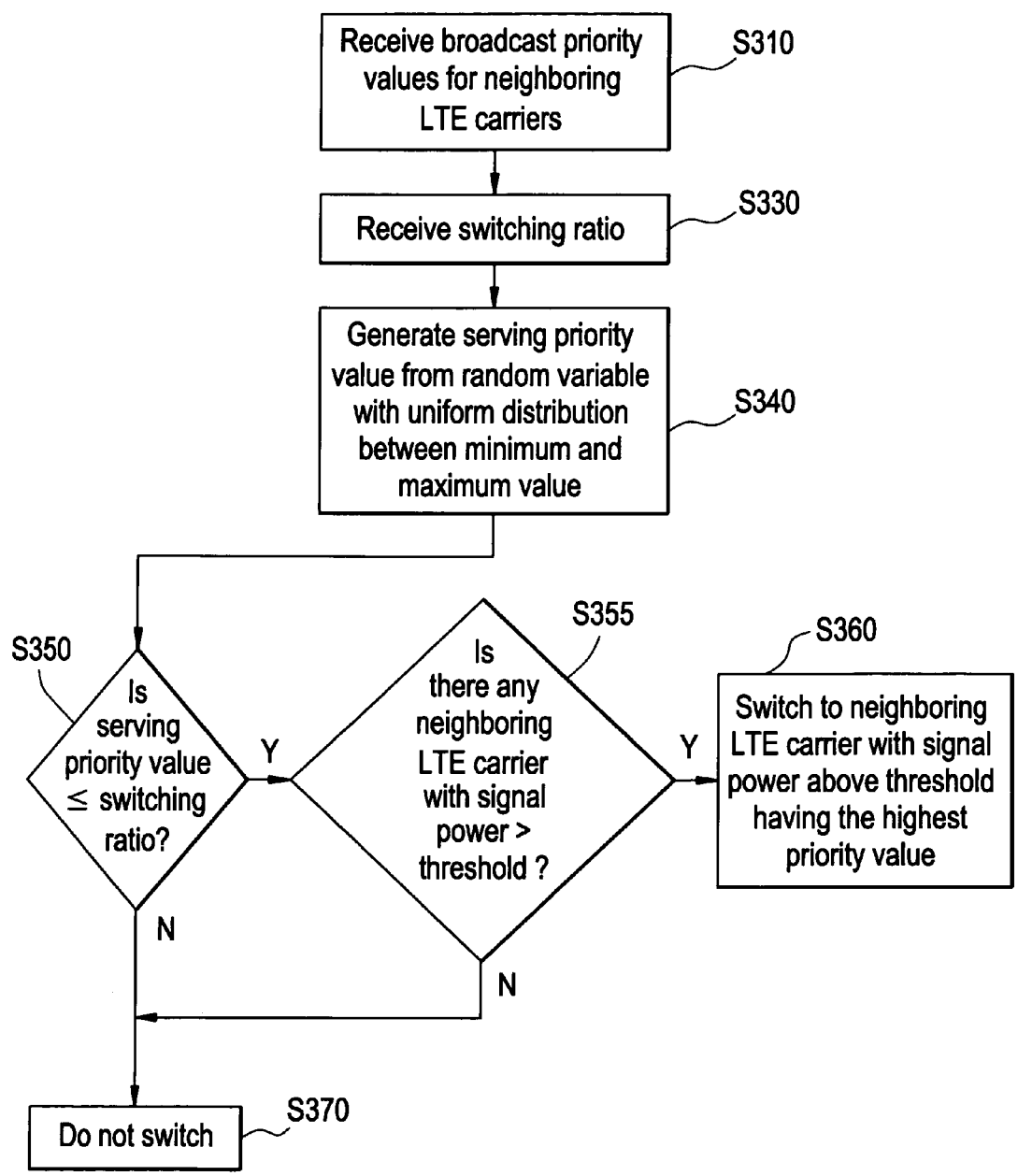
FIG. 3 is a flow chart illustrating a method of using a switching ratio to determine whether to switch RATs in an area having overlapping coverage from multiple RATs.

FIG. 3 is a flow chart illustrating a method by which an AT may determine whether to switch RATs using a switching ratio and a randomly generated internal priority value.

Referring to FIG. 3, in step S310, the AT 130, which is attached to the HRPD AN, receives priority values associated with neighboring LTE carriers in overlapping second coverage area 120 broadcasted by the HRPD AN.

In step S330, the AT 130 receives a switching ratio broadcasted by the HRPD AN.

In step S340, the AT 130 internally generates a serving priority value. The AT 130 generates the serving priority value between a minimum value and maximum value based on a uniformly distributed random variable. The serving priority value may be represented as, for example, a three bit value having a minimum value of '0' and a maximum value of '7'. The serving priority value indicates the tendency of the AT 130 to maintain the carrier the AT 130 is currently attached to as the AT 130's serving carrier. For example, the serving priority value may be generated from a uniformly distributed random variable such that the percentage of the user population with the priority value smaller (or greater) than a threshold is equal to the ratio of the priority value smaller (or greater) than the threshold over the full range of the serving priority values.

In step S350, the AT compares the serving priority value to the switching ratio received in step S330 and if the serving priority value is less than or equal to the switching ratio received in step S330, the AT 130 proceeds to step S355. If not, the AT 130 proceeds to step S370.

In step S355, the AT 130 measures the signal powers of the neighboring LTE carriers and determines if any of the neighboring LTE carriers have signal power measurements above a threshold power value. The threshold power value may be a parameter broadcasted by the AN or a prenegotiated value stored in the AT 130. If there are any neighboring LTE carriers with signal power measurements above the threshold power value, the AT 130 proceeds to step S360. If not, the AT 130 proceeds to step S370.

In step S360, the AT switches to the neighboring LTE carrier with the highest priority value from among the neighboring LTE carriers having signal power measurements above the threshold power value or randomly picks one of the carriers to switch to.

In step S370, the AT 130 maintains the HRPD carrier it is currently attached to as the AT 130's serving carrier and does not switch to an LTE carrier.

According to the present example embodiment, ATs attached to the HRPD AN that are leaving a HRPD-only first coverage area 110 and entering a overlapped HRPD and LTE coverage area 120 make a decision to stay attached to an HRPD serving carrier or to switch RATs and attach to a neighboring LTE carrier based on a comparison of the switching ratio broadcasted by the HRPD AN and the internally generated serving priority value. Because each of the ATs generate the serving priority values based on an evenly distributed random variable, an operator of the HRPD AN can control the ratio of ATs that switch RATs by setting the switching ratio. For example, if the operator sets the switching ratio equal to or above the maximum value of the serving priority value, all the ATs may attach to neighboring LTE carriers (with sufficient signal power values) upon entering the overlapped coverage area 120. As another example, if the operator sets the switching ratio to an average of the minimum and maximum values of the internally generated priority value, 50% of the ATs may attach to neighboring LTE carriers (with sufficient signal power values) upon entering the overlapped coverage area 120. According to another example embodiment, the ATs may be configured so that if the ATs receive a particular switching ratio in step S330, for example '0', the AT may proceed directly to step S370 without generating an internal priority value. Accordingly, the HRPD AN operator may use the broadcasted switching ratio to block all the ATs from switching RATs and attaching to a neighboring LTE carrier upon entering the overlapped coverage are 120.

A method of handling traffic redirection in an area having overlapping coverage from multiple RATs according to another example embodiment will now be described with reference to FIGS. 1 and 4.

Figure 4:
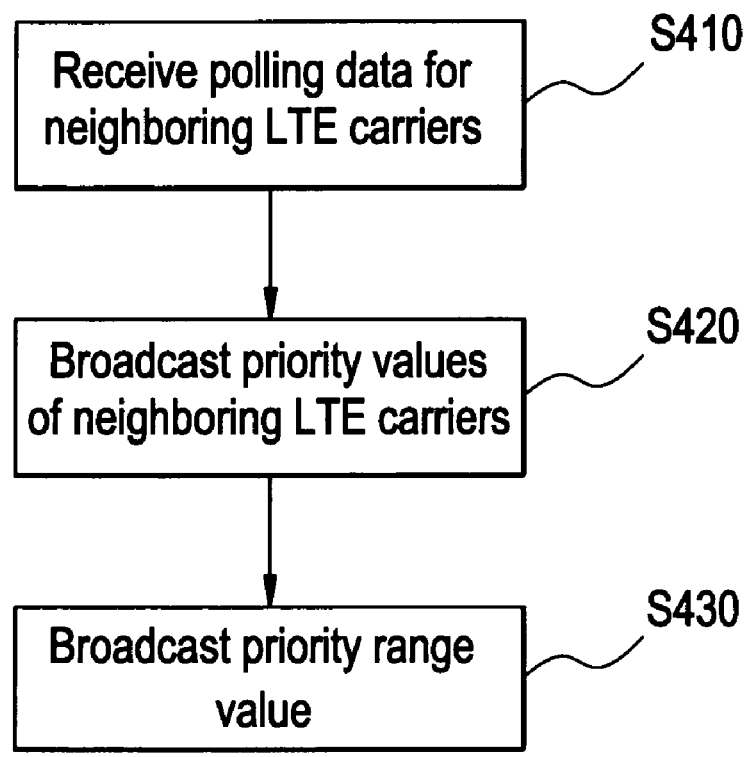
FIG. 4 is a flow chart illustrating a method of using a priority range to control traffic redirection in an area having overlapping coverage from multiple RATs.

FIG. 4 is a flow chart depicting a method by which an AN controls traffic redirection for ATs leaving a coverage area with one RAT and entering a coverage area having multiple RATs using a priority range. Referring to FIG. 4, in step S410, the HRPD AN handling first coverage area 110 receives polling data in the same manner described above with respect to step S210 in FIG. 2.

In step S420, the HRPD AN broadcasts priority values associated with neighboring LTE carriers to idle ATs that are inside the HRPD/LTE coverage area 120 and have HRPD serving carriers in the same manner as described above with respect to step S220 in FIG. 2. The idle ATs may have recently left HRPD-only coverage area 110 and entered HRPD/LTE coverage area 120.

In step S430, the HRPD AN broadcasts a priority range value to the ATs in the HRPD/LTE coverage area 120 that have HRPD serving carriers. An operator of the HRPD AN may use the broadcasted priority range to control the ratio of idle ATs that switch RATs and attach to the LTE AN. The manner in which an AT uses the broadcasted priority range will be described further below in conjunction with FIG. 5.

A method of determining whether to switch RATs when entering an area having coverage from multiple RATs according to another example embodiment will now be described with reference to FIGS. 1 and 5. This embodiment will be described referring to idle AT 130 in FIG. 1 leaving HRPD-only first coverage area 110 and entering HRPD/LTE coverage area 120.

Figure 5:
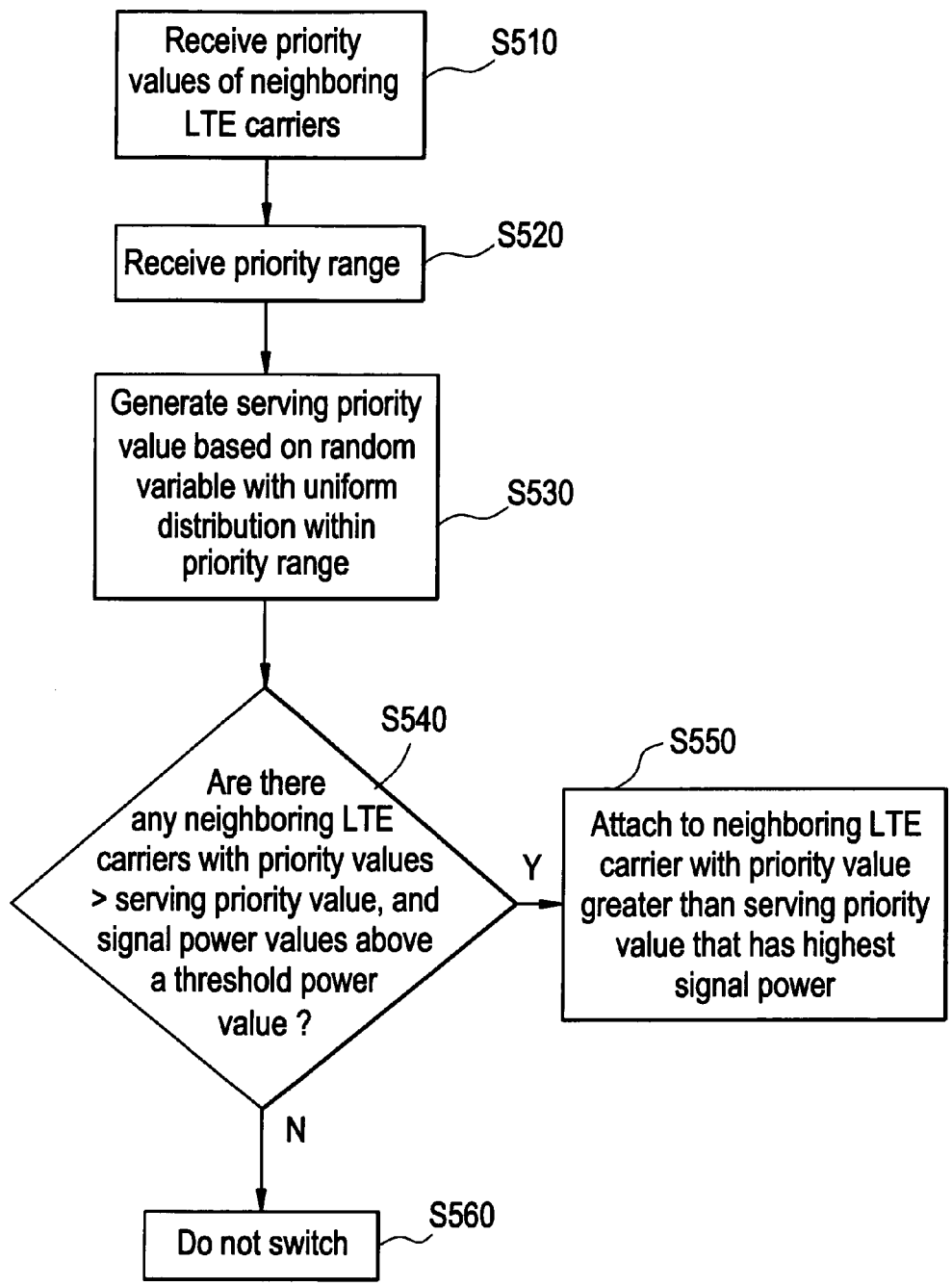
FIG. 5 is a flow chart illustrating a method of using a priority range to determine whether to switch RATs in an area having overlapping coverage from multiple RATs.

FIG. 5 is a flow chart illustrating a method by which an AT may determine whether to switch RATs using a priority range and a randomly generated internal priority value. In step S510, the AT receives priority values corresponding to neighboring LTE carriers in overlapping second coverage area 120 broadcasted by the HRPD AN.

In step S520, the AT receives a broadcasted priority range values which may include maximum and minimum values. The maximum and minimum values may each be represented as, for example, three bit values between '0' and '7'.

In step S530, the AT generates a serving priority value based on a random variable in the same manner described above with respect to step S340 in FIG. 3 with the exception that the random variable used in step S530 is uniformly distributed within the priority range received in step S520.

In step S540, the AT 130 compares the serving priority value generated in step S520 with the received priority values of the neighboring LTE carriers received in step S510 and compares the signal power values of the neighboring LTE carriers to a threshold power value. If there are one or more neighboring LTE carriers with a priority value greater than the serving priority value of the AT 130 and signal powers greater than the threshold power value, the AT 130 proceeds to step S550. If not, the AT 130 proceeds to step S560. The threshold power value may be a reference or predetermined value stored in the AT 130.

In step S550, the AT 130 attaches to the neighboring LTE carrier having the strongest signal power from among the LTE carriers with priority values greater than the switching priority value of the AT 130. Alternatively, the AT 130 may randomly switch to a carrier from among the LTE neighboring carriers with priority values greater that the switching priority value of the AT 130.

In step S560, the AT 130 maintains the HRPD carrier it is currently attached to as the AT 130's serving carrier and does not switch to an LTE carrier.

According to the present example embodiment, an operator of the HRPD AN can control to which neighboring LTE carriers ATs with HRPD serving carriers that are leaving a HRPD-only coverage area 110 and entering HRPD/LTE coverage area 120 attach by setting the priority range. For example, assuming the internally generated priority values of the ATs and the priority values of the LTE carriers both have minimum values of '0' and maximum values of '7', if an HRPD AN operator broadcasts a priority range of 4-5, the operator can ensure that the ATs can attach to neighboring LTE carriers (with sufficient signal power values) having priority values greater than or equal to 5, and that none of the ATs attach to neighboring LTE carriers with priorities less than 4.

A method of determining whether to switch RATs when entering an area having coverage from multiple RATs according to another example embodiment will now be described with reference to FIGS. 1 and 6. This embodiment will be described referring to idle AT 130 in FIG. 1 leaving HRPD-only first coverage area 110 and entering the overlapped second coverage area 120.

Figure 6:
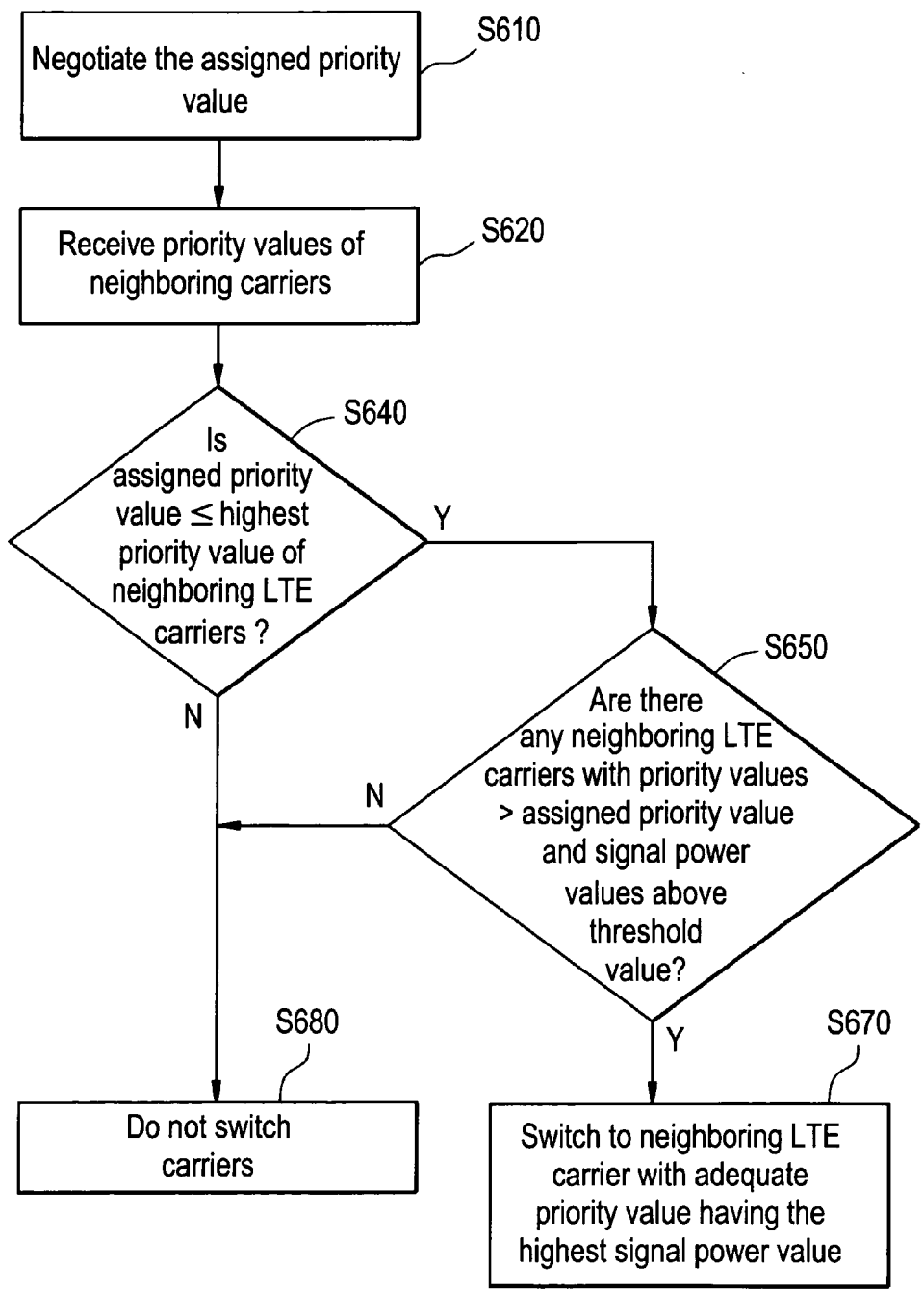
FIG. 6 is a flow chart illustrating a method of using assigned priority values to determine whether to switch RATs in an area having overlapping coverage from multiple RATs.

FIG. 6 is a flow chart illustrating a method by which an AT may determine whether to switch RATs using a priority value assigned by an AN. In step S610, the AT 130 receives an assigned serving priority value during the initial session negotiation. The AN could also assign the serving priority value to the AT via unicast dedicated messages. The assigned priority value may be represented as, for example, a three bit value between '0' and '7'. The assigned serving priority value is an indication of the tendency of the AT 130 to maintain the carrier that the AT 130 is currently attached to as the AT 130's serving carrier.

Referring to FIG. 6, in step S620, the AT 130 receives broadcasted priority values corresponding to LTE carriers in overlapping second coverage area 120 broadcasted by the HRPD AN.

In step S640, the AT 130 compares the assigned serving priority value from step S610 to the priority values for LTE carriers received in step S620. If the assigned serving priority value is lower than the highest priority value of the priority values received in step S620, the AT proceeds to step S650. If the assigned serving priority value is not lower than the highest priority value of the priority values received in step S620, the AT proceeds to step S680.

In step S680, the AT 130 stays with the HRPD carrier it is currently attached to and does not switch to an LTE carrier.

In step S650, the AT 130 compares the signal power values of the neighboring LTE carriers having priority values higher than the assigned serving priority value to a threshold power value. The threshold power value may be a reference or predetermined value stored in the AT 130. If there are any LTE carriers having priority values higher than the assigned serving priority value and signal power values higher than the threshold power value, the AT proceeds to step S670; otherwise, the AT 130 proceeds to step S680.

In step S670, the AT switches to the LTE carrier having the highest signal power from among the LTE carriers with priority values greater than the priority value assigned to the AT 130.

The methods illustrated in FIGS. 2-6 are explained separately, in some example embodiments of the invention, the methods depicted in FIGS. 2-6 may be used together. For example, in wireless system 100, the switching ratio discussed in conjunction with FIG. 2 may be broadcast in addition to the priority range discussed in conjunction with FIG. 4 and both may be used to control switching behaviors of ATs in wireless system 100. As another example, ATs in wireless system 100 may receive both switching ratios, as is discussed in conjunction with FIG. 3, and priority ranges, as is discussed in conjunction with FIG. 5.

As yet another example, ATs in wireless system 100 may be divided into groups of regular ATs and special ATs. An AN may control the switching behavior of regular ATs by broadcasting switching ratios and/or priority ranges to the regular ATs as is discussed in conjunction with FIGS. 3 and 5, respectively, and the AN may control the switching behavior of special ATs by negotiating assigned priority values with special ATs using dedicated messages during the initial session negotiation, which is discussed in conjunction with FIG. 6. This will allow an AN operator to assign specific serving priority values to special ATs that may need to attach to a network following a specific RAT due to specific services needed by the special ATs.

Figure 7:
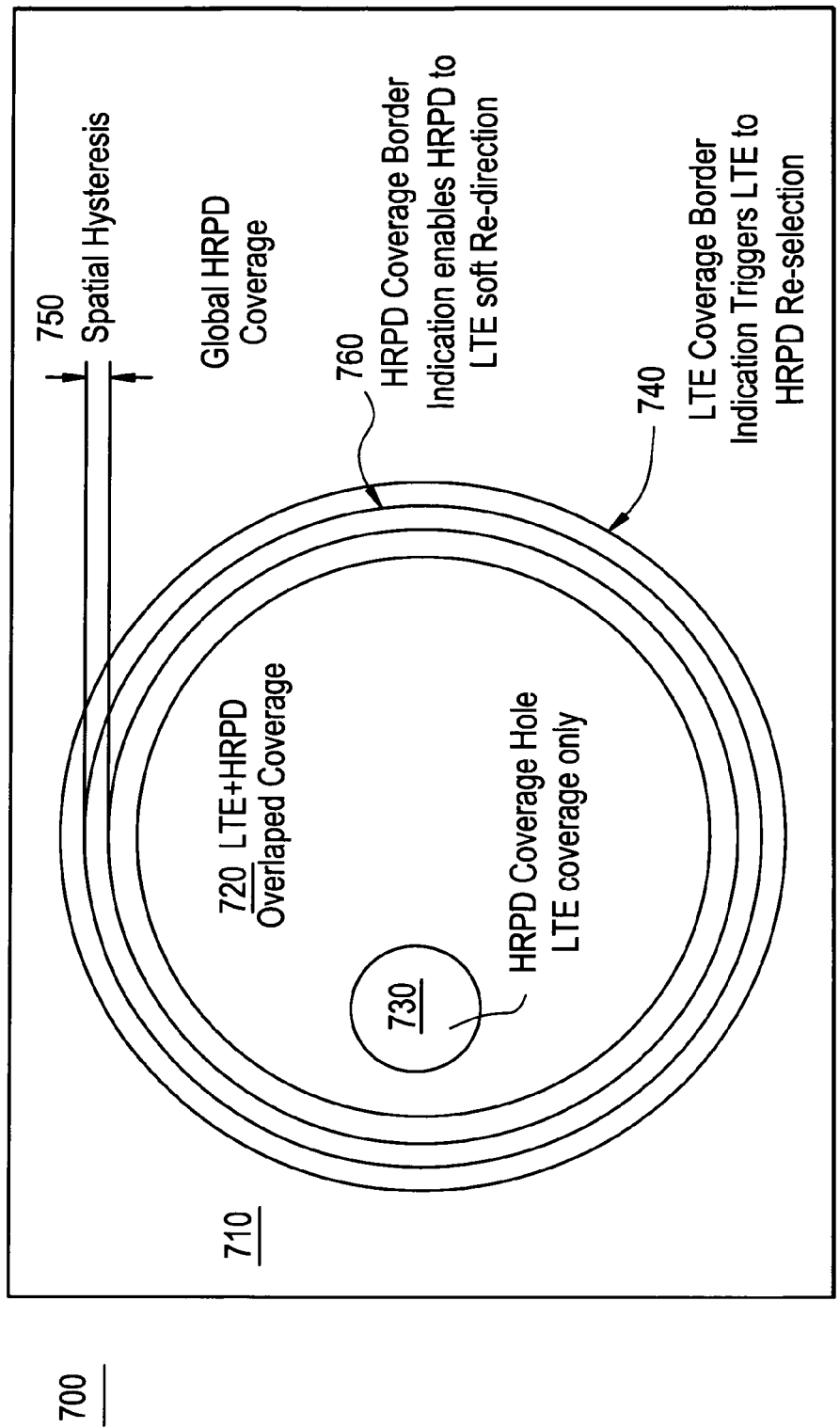
FIG. 7 is a diagram illustrating spatial hysteresis in a wireless system having two RATs with overlapping coverage areas.

FIG. 7 is a diagram of a wireless system 700 having overlapping coverage from carriers following two different RATs in which spatial hysteresis is provided according to an example embodiment of the invention. Spatial hysteresis is used to prevent a 'ping-pong' effect that may occur wherein ATs along a border of an HRPD-only coverage area and an overlapped LTE and HRPD coverage area may switch rapidly back and forth between RATs.

FIG. 7 depicts HRPD-only coverage area 710, overlapped LTE and HRPD coverage area 720, LTE-only coverage area 730, first area 740, second area 750, and third area 760. First area 740 is an LTE coverage border, second area 750 is a spatial hysteresis area, and third area 760 is an HRPD coverage border. The HRPD coverage areas represent the coverage areas of HRPD carriers associated with an HRPD AN, and the LTE coverage areas represent the coverage areas of LTE carriers associated with an LTE AN in a manner similar to that described above with respect to FIG. 1.

The carrier switching behavior of ATs in wireless system 700 is affected by which area each AT is located in. The carrier switching behaviors of the ATs in first, second and third area 740, 750 and 760 are controlled by broadcasts from the associated HRPD AN and the LTE AN. The switching behaviors may be controlled such that: in first area 740, ATs attached to HRPD carriers will likely stay attached to HRPD carriers, and ATs attached to LTE carriers will likely switch RATs and attach to HRPD carriers; in second area 750, ATs attached to HRPD carriers will likely stay attached to HRPD carriers, and ATs attached to LTE carriers will likely stay attached to LTE carriers; and in third area 760, ATs attached to HRPD carriers will likely switch RATs and attach to LTE carriers, and ATs attached to LTE carriers will likely stay attached to LTE carriers. The manner in which the switching behaviors of the ATs are controlled by the HRPD AN and the LTE AN is described in more detail below in conjunction with FIGS. 8A and 8B.

Figure 8A:
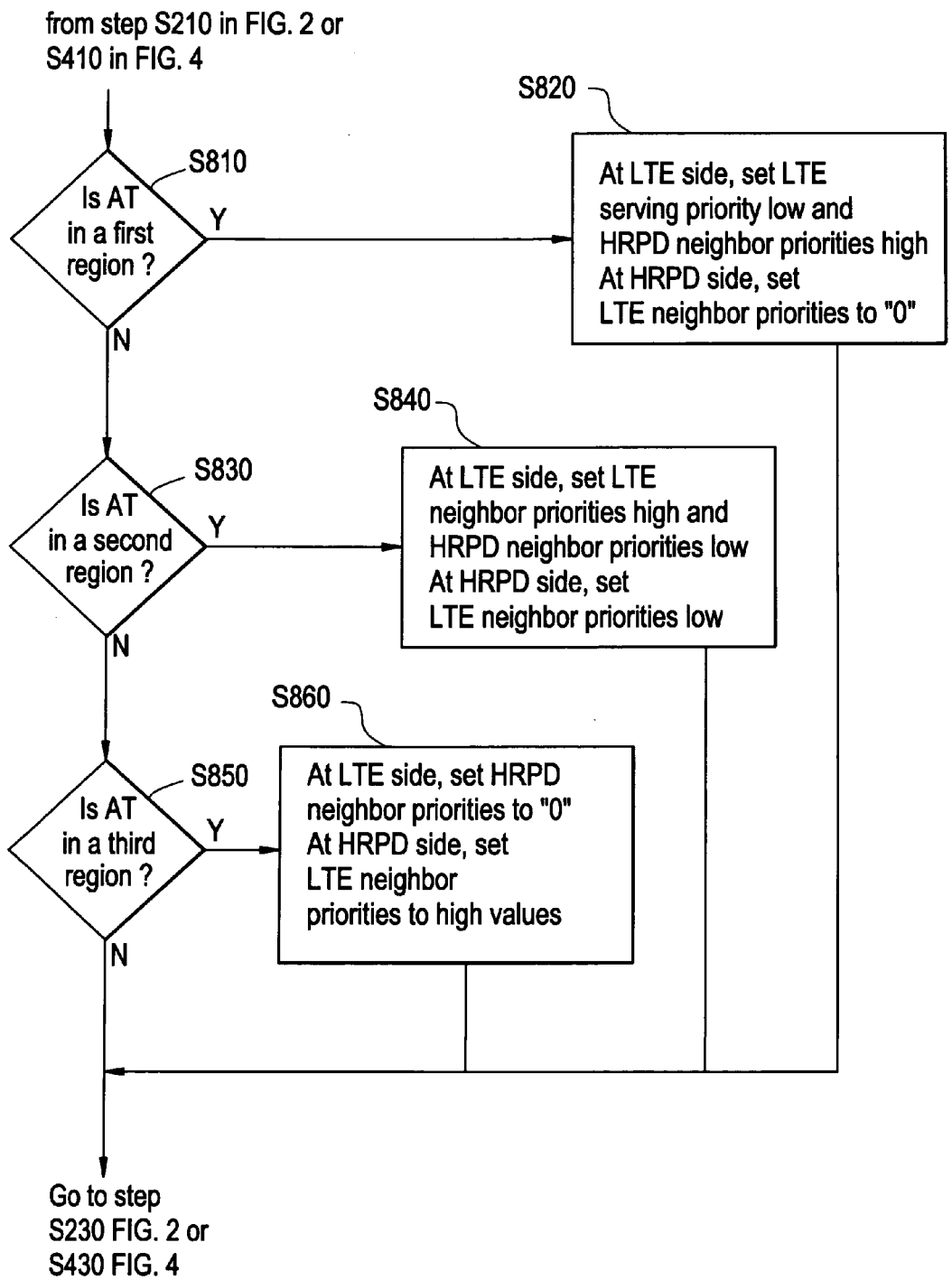
FIGS. 8A-8B are a flow chart illustrating a method of using a switching ratio and spatial hysteresis to determine whether to switch RATs in an area having overlapping coverage from multiple RATs.
Figure 8B:
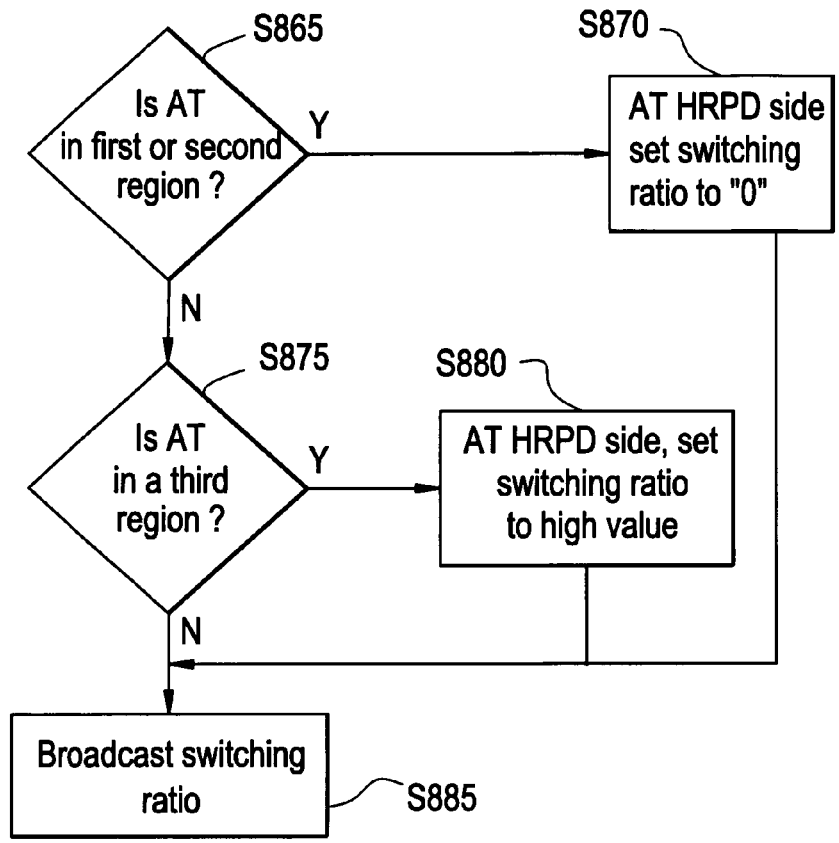

FIGS. 8A and 8B illustrate a flow chart of a method for implementing spatial hysteresis in an area having overlapping coverage from multiple RATs according to an example embodiment of the invention.

The method depicted in FIG. 8A is a more detailed depiction of step S220 in FIG. 2 or step 420 in FIG. 4. With respect to the method depicted in FIG. 2, after performing step S210, the HRPD AN performs steps S810-S860 for each AT connected to the HRPD RAT before proceeding to step S230. With respect to the method depicted in FIG. 4, after performing step S410, the HRPD AN performs steps S810~S860 for each AT attached to the HRPD AN before proceeding to step S430.

In step S810, if an AT is in first area 740, then in step S820, for ATs attached to LTE carriers, the LTE AN sets the priority values for LTE serving carriers low and sets the priority values for neighboring HRPD carriers high. For ATs attached to the HRPD carriers, the HRPD AN sets the priority values of neighboring LTE carriers to '0'. Then the HRPD AN proceed to step S220 in FIG. 2 or S420 in FIG. 4. If an AT is not in first area 740, the HRPD AN proceed to step S830.

In step S830, if an AT is in second area 750, then in step S840, for ATs attached to LTE carriers, the LTE AN sets the priority values of neighboring LTE carriers high and sets the priority values of neighboring HRPD carriers low. For ATs attached to HRPD carriers, the HRPD AN sets the priority values or neighboring LTE carriers low. Then the HRPD AN proceeds to step S220 in FIG. 2 or step S420 in FIG. 4.

If an AT is not in second area 750, the HRPD proceeds to step S850. In step S850, if an AT is in third area 760, then in step S860, for ATs attached to an LTE carrier, the LTE AN sets the priority vales for HRPD carriers to '0'. For ATs attached to an HRPD carrier, the HRPD AN sets the priority values of neighboring LTE carriers to high values. Then the HRPD AN proceeds to step S220 in FIG. 2 or step S420 in FIG. 4.

If an AT is not in third area 760, the HRPD proceeds to step S220 in FIG. 2 or step S420 in FIG. 4.

The method depicted in FIG. 8B is a more detailed depiction of step S230 in FIG. 2. With respect to the method depicted in FIG. 2, after performing step S220, the HRPD AN performs steps S810~S860 for each AT attached to the HRPD RAT.

In step S865, if an AT is in first area 740 or the second area 750, then in step S870, for ATs attached to the HRPD carriers, the HRPD AN sets the switching ratio to '0'. Then the HRPD AN proceeds to step S885 and broadcasts the switching ratio. If an AT is not in first area 740, the HRPD AN proceed to step S875.

In step S875, if an AT is in third area 760, then in step S880, for ATs attached to HRPD carriers, the HRPD AN sets the switching ratio to a high value. Then the HRPD AN proceeds to step S885. In step S885, the HRPD AN broadcasts the switching ratio.

Though the methods illustrated in FIGS. 2-8 are explained in terms on inter-RAT switching between HRPD RAT and LTE RAT, the methods illustrated in FIGS. 2-8 may also be applied switching from LTE RAT to HRPD RAT, may be applied to switching between any two differing RAT, and may be applied to intra-RAT switching. For example, for intra-RAT switching, the methods illustrated in FIGS. 2-8 may also be applied in a wireless system including a first coverage area associated with a first HRPD carrier, and a second coverage area associated with overlapping coverage from the first HRPD carrier as well as one or more second HRPD carriers. For example, the methods illustrated in FIGS. 2-8 may be applied to the one or more second HRPD carriers in the same manner explained above with respect to the LTE carriers.

Figure 9:
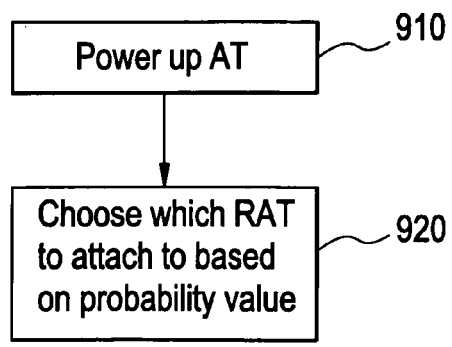
FIG. 9 is a flow chart illustrating method of powering up an access terminal in an area having overlapping coverage from multiple RATs.

ATs that power up in an area having overlapping coverage from multiple RATs must choose which RAT to attach to. This decision may also impact loading one each of the particular RATs. FIG. 9 is a flow chart illustrating method of controlling carrier selection for ATs powering up in an area having overlapping coverage from multiple RATs.

Referring to FIG. 9, in step S910, an AT powers up in a area having coverage from carriers associated with more than one type of RAT according to an example embodiment of the present invention. For example, AT 130 in FIG. 1 may power up inside HRPD/LTE coverage area 120.

In step S920, the AT 130 may use a probability value to determine whether to attach to an HRPD carrier or an LTE carrier. The probability value may be a value stored in the AT 130. The AT 130 may, for example, pseudo-randomly generate an RAT-choosing value based on the probability value. The AT 130 may then compare the pseudo-randomly generated RAT-choosing value to a threshold value. In one example, if the RAT-choosing value is below a threshold value stored in the AT 130, the AT 130 may choose an HRPD carrier to attach to, and if the RAT-choosing value is equal to or above the threshold value, the AT 130 may choose an LTE carrier to which to attach.

According to the present example embodiment, a wireless system operator may control the ratio of powering-up AT traffic that is assigned to each of the multiple RATs.

The invention being thus described, it will be obvious that the same may be varied in many ways. Such variations are not to be regarded as a departure from the invention, and all such modifications are intended to be included within the scope of the invention.

What is claimed:

1. A method of selective traffic redirection in a geographical area having coverage from overlapping carriers, the method comprising:
   broadcasting priority values from a first access network (AN), to access terminals (ATs) attached to a first carrier of the first AN, wherein the priority values associated with each of one or more neighboring carriers, the one or more neighboring carriers are carriers of a second AN and have coverage areas that overlap with a coverage area of the first carrier, the first AN uses a first radio access technology (RAT) and the second AN uses a second RAT different from the first RAT; and
   broadcasting a switching ratio from the first AN to the AT's, wherein the switching ratio controls a percentage of idle ATs which switch from the first carrier to a carrier from among the one or more neighboring carriers.

2. The method of claim 1, further comprising:
   receiving polling data from the second AN at the first AN, wherein the polling data includes loading conditions of the one or more neighboring carriers, and the priority values of the one or more neighboring carriers are determined at the first AN based on the loading conditions of the one or more neighboring carriers.

3. The method of claim 2, wherein the first RAT is high rate packet data (HRPD), the second RAT is long term evolution (LTE), and the polling data is received at the first AN through an S101 tunnel.

4. The method of claim 1, wherein the geographical area includes first and second regions, the first and second regions do not overlap, the ATs attached to the first carrier include first ATs in the first region and second ATs in the second region, and the broadcasting steps include
   broadcasting from the first AN a low switching ratio and low priority values for the one or more neighboring carriers to the first ATs to prevent the first ATs from switching from the first carrier to a carrier from among the one or more neighboring carriers, and broadcasting from the first AN a high switching ratio and high priority values for the neighboring carriers to the second ATs to promote the second ATs switching from the first carrier to a carrier from among the one or more neighboring carriers.

5. A method of selective traffic redirection in a geographical area having coverage from overlapping carriers, the method comprising:
   receiving a switching ration from a first access network (AN) at an access terminal (AT) attached to a first carrier of the first AN;
   generating a serving priority value at the AT base on a random variable uniformly distributed between minimum and maximum values; and
   determining whether or not to switch the AT from the first carrier to a carrier from among one or more neighboring carriers based on the serving priority value and the switching ratio, the one or more neighboring carriers being carriers of a second access network (AN) and having coverage areas that overlap a coverage area of the first carrier, the first AN using a first radio access technology (RAT) and the second AN using a second RAT different from the first RAT.

6. The method of claim 5, wherein the first RAT is high rate packet data (HRPD), and the second RAT is long term evolution (LTE).

7. The method of claim 5, wherein the determining includes generating a first comparison result by comparing the serving priority value to the switching ratio and determining whether or not to switch the AT from the first carrier to a carrier from among the one or more neighboring carriers based on the first comparison result.

8. The method of claim 7 wherein the determining further includes:
   generating a second comparison result by comparing signal strengths of each of the one or more neighboring carriers to a threshold value, and determining whether or not to switch the AT from the first carrier to a carrier from among the one or more neighboring carriers based on the second comparison result and the first comparison result.

9. The method of claim 7, further comprising:
   receiving, at the AT from the first AN, priority values associated with each of one or more neighboring carriers;
   determining to switch the AT from the first carrier to a carrier from among the one or more neighboring carriers based on the first and second comparison results; and
   switching to a neighboring carrier having the highest associated priority value from among the one or more neighboring carriers.

10. A method of selective traffic redirection in a geographical area having coverage from overlapping carriers, the method comprising:
    broadcasting priority values from a first access network (AN) to access terminals (ATs) connected to a first carrier of the first AN, wherein the priority values are associated with each of one or more neighboring carriers, the one or more neighboring carriers are carriers of a second AN and have coverage areas that overlap with a coverage area of the first carrier, the first AN uses a first radio access technology (RAT) and the second AN uses a second RAT different from the RAT;
    broadcasting a priority range from the first AN to the ATs, wherein the priority range includes both a minimum value and a maximum value, and the minimum and maximum values control a range in which serving priority values are generated at the ATs.

11. The method of claim 10, further comprising:
    receiving polling data from the second AN at the first AN, wherein the polling data includes loading conditions of the one or more neighboring carriers, and the priority values of the one or more neighboring carriers are determined at the first AN based on the loading conditions of the one or more neighboring carriers.

12. The method of claim 11,
    wherein the first RAT is high rate packet data (HRPD), the second RAT is long term evolution (LTE), and the polling data is received at the first AN through an S101 tunnel.

13. The method of claim 10, wherein the geographical area includes first and second regions, the first and second regions do not overlap, the ATs attached to the first carrier include first ATs in the first region and second ATs in the second region, and the broadcasting steps include
    broadcasting from the first AN low priority values for the one or more neighboring carriers to the first ATs to prevent the first ATs from switching from the first carrier to a carrier from among the one or more neighboring carriers, and broadcasting from the first AN high priority values for the neighboring carriers to the second ATs to promote the second ATs switching from the first carrier to a carrier from among the one or more neighboring carriers.

14. A method of selective traffic redirection in a geographical area having coverage from overlapping carriers, the method comprising:
   receiving priority values at an access terminal (AT) connected to a first carrier of a first access network (AN), wherein the priority values are associated with each of one or more neighboring carriers, the one or more neighboring carriers are carriers of a second AN and have coverage areas that overlap with a coverage area of the first carrier, the first AN uses a first radio access technology (RAT) and the second AN uses a second RAT different from the first RAT;
   receiving a priority range at the AT;
   generating a serving priority value at the AT based on a random variable uniformly distributed within the received priority range; and
   determining whether or not to switch the AT from the first carrier to a carrier from among the one or more neighboring carriers based on the serving priority value and the priority values of the one or more neighboring carriers.

15. The method of claim 14 wherein the determining includes generating a comparison result by comparing the priority values of the one or more neighboring carriers to the serving priority value and comparing signal strengths of each of the one or more neighboring carriers to a threshold value, and determining whether or not to switch the AT from the first carrier to a carrier from among the one or more neighboring carriers based on the comparison result.

16. The method of claim 15, wherein the determining includes determining to switch the AT to a carrier, from among the one or more neighboring carriers, which has a priority value above the serving priority value, a signal strength above the threshold value, and a highest signal strength of all signal strengths of the one or more neighboring carriers.

17. The method of claim 14 wherein the first RAT is high rate Packet data (HRPD), and the second RAT is long term evolution (LTE).

18. A method of selective traffic redirection in an area having carriers with overlapping coverage, the method comprising:
   receiving neighboring priority values from a first access network (AN) at an access terminal (AT) attached to a first carrier of the first AN, wherein the neighboring priority values are associated with each of one or more neighboring carriers, the one or more neighboring carriers are carriers of a second AN and have coverage areas that overlap a coverage area of the first carrier, the first AN uses a first radio access technology (RAT) and the second AN uses a second RAT different from the first RAT;
   receiving an assigned priority value at the AT from the first AN, wherein the assigned priority value is associated with the first carrier; and
   determining whether to switch the AT from the first carrier to a carrier from among the one or more neighboring carriers based on the assigned priority value, the neighboring priority values of the one or more neighboring carriers, and signal power values of the one or more neighboring carriers.

19. The method of claim 18, wherein the first RAT is high rate packet data (HRPD), and the second RAT is long term evolution (LTE).

20. The method of claim 18, wherein the determining includes generating a first comparison result by comparing the assigned priority value to the received priority values of the one or more neighboring carriers and determining whether or not to switch the AT from the first carrier to a carrier from among the one or more neighboring carriers based on the first comparison result.

21. The method of claim 20, wherein the determining further includes:
   comparing signal strengths of each of the one or more neighboring carriers to a threshold value,
   selecting carriers, from among the neighboring carriers, having priority values greater than the assigned priority value and signal strengths higher than the threshold value, and switching the AT from the first carrier to a carrier from among the of the selected carriers, having a highest signal power.

22. A method of powering up an access terminal (AT) in a geographical area having coverage from at least first and second overlapping radio access technologies (RATs), the method comprising:
   powering up the AT;
   upon powering up the AT, generating a selection values as the outcome of a random selection, the random selection having a weighted probability based on a probability value assigned to the AT;
   comparing the selection value to a threshold value;
   choosing, at the AT, between connecting the AT to carriers of the first RAT and connecting the AT to carriers of the second RAT based on the comparison, the first RAT being different from the second RAT.

* * * * *